Patented Mar. 20, 1945

2,371,618

UNITED STATES PATENT OFFICE 2,371,618

PRESERVATION OF TEXTILE MATERIALS

Alden W. Hanson and William C. Goggin, Midland, Mich., assignors to The Dow Chemical Company, Midland, Mich., a corporation of Michigan No Drawing. Application February 20, 1941, Serial No. 379,902

5 Claims. (Cl. 8—136.5)

This invention relates to the preservation of textile materials and is particularly concerned with a procedure whereby more nearly permanent protection of textiles from attack by plant and animal parasites is accomplished and the textile composition thereby obtained.

Of the hundreds of organic chemical compounds and compound mixtures heretofore suggested for use in mold and moth proofing of textiles, many have been alleged to give a permanent result. To the contrary, most of such compounds and proprietary mixtures are quickly dissipated out of textile products whereby the latter become vulnerable to parasitic attack. Such failure of protection is not infrequently caused by dusting or vaporization of the toxicant, although the oxidation attendant upon weathering may be a contributing factor. Also the solubility of many preservative compounds in water, soap solutions, and organic solvents commonly employed in dry cleaning renders them but temporarily effective. This property of solubility is particularly disadvantageous in connection with canvas awnings, tents, ground covers, etc., which are subjected to intermittent showering by rain or dew and are frequently stored in a damp condition or in contact with the earth whereby optimum conditions for mold and bacterial growth are provided. Such attack materially lowers the tensile strength of canvas and other fabrics and further results in unsightly stains and undesirable odors.

We have discovered that textile materials may be protected from attack by plant and animal parasites for long periods of time by treatment with an organic preservative and a vinylidene chloride resin product. In carrying out the invention the organic preservative and a finely-divided solid thermoplastic vinylidene chloride resin product are deposited in and on the textile material, and the treated material thereafter heated to a temperature between the softening point of the resin and the decomposition temperature of the resin and preservative. The preferred embodiment of the invention includes subjecting the treated fabric to a pressure treatment further to bond the resin product and preservative to the treated material. By operating in this fashion, a textile product is obtained in which the parasiticide is so held as not to be dusted or otherwise dissipated away. The resin forms a semi-permeable protective coating for the preservative which permits the latter to function while at the same time bonding the preservative to the textile material. Furthermore, the protective resin coating frees the preservative at a very slow rate whereby a toxic concentration of preservative in and on the treated textile is maintained over an extended period. The vinylidene chloride resin products herein employed are substantially insoluble in water, soap solution, and most organic solvents so that the protection afforded by the treatment is not materially affected by showering, washing with soap solution, or dry cleaning.

The expression "vinylidene chloride resin product" as herein employed refers to vinylidene chloride polymers, compositions such as co-polymers and polymer mixtures comprising an appreciable proportion of vinylidene chloride, and mixtures of such polymers and co-polymers with plasticizers and modifying agents common to the art. While "appreciable proportion" is preferably construed as referring to a mixture comprising at least 25 per cent by weight of vinylidene chloride, solid thermoplastic compositions comprising down to 5 per cent or less of vinylidene chloride may be utilized according to the present invention. The preparation and properties of a number of these resin materials are described in United States Patents Nos. 2,160,903, 2,160,904, and 2,160,931–2,160,948, inclusive.

The term "organic preservative" refers to organic parasiticides compatible with the resin but does not include such volatile materials as formaldehyde, ethylene oxide, methyl bromide, and other products of a gaseous or impermanent nature. A preferred group of organic preservatives are those soluble in or otherwise absorbed by the resin. Phenols and their salts and especially the polychlorophenols have been found particularly valuable.

The deposition of the treating materials may be accomplished in any suitable manner but preferably by dusting a mechanical mixture of the preservative and resin into and onto the textile material. Alternate procedures comprise treating the textile material successively with the preservative and the resin in dust form, or dusting the resin into a textile material previously impregnated with the preservative whether in liquid or solid form. A further and preferred embodiment comprises dusting the textile with a solid solution or dispersion of the preservative in the resin. Regardless of the mechanics involved and order followed in depositing the treating materials in and on the textile, all dust materials employed must be in very finely-divided form. Products of particle size smaller than 50 screen mesh (U. S. sieve series) have been found satisfactory, and materials of 100 screen mesh particle size or finer are preferred.

The temperature to which the treated materials are heated varies with the particular resin and preservative employed. Temperatures above the softening point of the resin and up to about 225° C. or higher are generally satisfactory, care being exercised in approaching the decomposition temperature of either resin or preservative. While the treated textile may be heated to a softening or fusion temperature and thereafter subjected to the required pressure treatment, a convenient method of operation comprises pressing between hot plates, passing over or between hot rolls, or by pressing with a mangle.

In carrying out the invention, amounts of resin equivalent to from about 2 per cent to about 200 per cent by weight of the textile have been found satisfactory. A preferred range is from 3 per cent to 50 per cent by weight of the resin.

The amount of preservative employed varies widely with the exact parasiticide concerned and the nature and degree of protection desired. Thus a very small or a very high percentage of preservative to textile may be required or desirable. With phenols and their salts, it has been found that a concentration in the range of from about 0.05 to about 5.0 per cent by weight in the textile is generally sufficient. Preferred amounts of polychlorophenols are from 0.25 per cent to 4.0 per cent by weight of the textile.

When operating with the polychlorophenols and their salts, the amounts of preservative and resin are generally selected so that there is deposited in the textile from 2 to 50 parts by weight of preservative for each 100 parts of resin. A preferred ratio is from 20 to 50 parts of preservative per 100 parts of resin.

In a preferred embodiment of the invention employing a preservative soluble in the resin, the preservative may be incorporated with the resin as in solid solution or by adsorption. Thus, when vinylidene chloride polymer in finely-divided form is wet with a solution of a polychlorophenol in acetone, carbon tetrachloride or other non-solvent for the resin, the polychlorophenol is adsorbed into the resin particles. When the composition is evaporated to dryness or otherwise processed to recover solid constituents, a fine dust is obtained wherein at least a portion of the preservative is carried in solid solution by the resin. A similar result is achieved when a phenol or other preservative of relatively high vapor pressure is mechanically mixed in finely-divided form with the resin and the mixture allowed to stand for some period of time. When such a composite product is used, treated textile material is obtained which has a more nearly uniform deposit of preservative and in which the preservative is retained for a longer period of time than when either a mechanical mixture or successive treatments with resin dust and preservative dust alone are employed.

While the following examples are for the most part concerned with the treatment of canvas, it is to be understood that the invention is in no way limited thereby and is equally applicable to other textile materials such as yarns, threads, strands, filaments, cords, and cloth of all kinds whether of wool, cotton, linen, silk, wood cellulose, or other material liable to attack by animal or vegetable parasites.

EXAMPLE 1

82 parts by weight of a finely-divided vinylidene chloride copolymer (average particle size below 100 screen mesh) containing 88 per cent vinylidene chloride and 12 per cent vinyl chloride was compounded with 10 parts of $\alpha.\alpha'$-diphenyl-diethyl ether, 3 parts of 2.2'dihydroxy-benzophenone, and 5 parts of tributyl-aconitate as stabilizers and plasticizers for the resin, and with sufficient pentachlorophenol to obtain resin compositions comprising from 0 to 20 per cent by weight of the pentachlorophenol. In each instance the compounding was accomplished by wetting the co-polymer with an acetone solution of the pentachlorophenol and other addition agents, and thereafter evaporating the acetone out of the mixture. The residue from such operation consisted of a fine dust product in which the pentachlorophenol and resin modifiers were dissolved in or adsorbed on the resin particles.

These dust products were shaken onto strips of 12 ounce canvas whereby the particles were dispersed throughout the fabric structure. The treated canvas strips were then heated to 200° C. between hot plates and under moderate pressure and thereafter cooled. Each strip was weighed to determine the actual pick-up of resin composition. Portions of each strip were then subjected to pressure spraying with water for 12 hours and thereafter air-dried. These sprayed pieces were inoculated with spores of *Chaetomium globosum* and incubated in petri dishes on wet nutrient agar-agar surfaces for two months. The following table sets forth the results obtained with the canvas samples treated with representative resin compositions:

Table

| Percent by weight of pentachlorophenol incorporated in resin composition | Percent by weight of resin composition and preservative taken up by canvas | Percent by weight of pentachlorophenol in canvas | Condition of canvas after 2 months' exposure |
| --- | --- | --- | --- |
| 0 | 2.15 | 0 | Heavy mold growth. |
| 0 | 12.3 | 0 | Do. |
| 4 | 8.8 | 0.35 | Clean and bright. |
| 6 | 7.4 | 0.45 | Do. |
| 10 | 4.2 | 0.42 | Do. |
| 10 | 11.0 | 1.10 | Do. |
| 15 | 3.4 | 0.51 | Do. |
| 15 | 11.3 | 1.70 | Do. |
| 20 | 6.7 | 1.34 | Do. |

EXAMPLE 2

A similar composition was prepared containing the same co-polymer and amounts of materials as set forth in the preceding example. The compounding of this mixture was accomplished by subjecting the several constituents to intense mechanical grinding and mixing whereby the pentachlorophenol and other modifying agents were adsorbed into and onto the particles of vinylidene chloride resin material. This finely-divided composition was dusted into canvas strips and the strips thereafter warmed and pressed. 1 x 3 inch segments of the treated canvas samples were tested to determine tensile strength. Other portions of each canvas strip were then showered with water for 24 hours. 1 x 3 inch segments of both showered and unshowered portions of the canvas strips were buried in moist garden soil to determine their resistance to rotting and bacterial decomposition. At the end of 3 months, the canvas samples were dug up and the tensile strength of each determined to determine the effectiveness of the several treating compositions. The following table sets forth representative results obtained:

*Table*

| Per cent by weight of pentachlorophenol in the resin composition | Per cent by weight resin composition in the canvas | Per cent by weight pentachlorophenol in the canvas | Tensile strength in pounds of a 1 x 3 inch sample | | |
|---|---|---|---|---|---|
| | | | Original | After 3 months' exposure | |
| | | | | Showered | Unshowered |
| 0 | 20.0 | 0 | 186 | 0 | 45 |
| 4 | 43.2 | 1.66 | 178 | 166 | 152 |
| 6 | 26.3 | 1.49 | 194 | 70 | 174 |
| 6 | 34.7 | 2.08 | 188 | 150 | 175 |
| 6 | 43.2 | 2.59 | 176 | 155 | 142 |
| 8 | 52.7 | 3.90 | 205 | 194 | 212 |
| 8 | 40.0 | 2.96 | 195 | 166 | 174 |
| 10 | 29.5 | 2.68 | 183 | 126 | 174 |
| 10 | 34.7 | 3.16 | 180 | 175 | 140 |
| 10 | 40.0 | 3.64 | 185 | 178 | 144 |

EXAMPLE 3

87 parts by weight of a finely-divided vinylidene chloride-ethyl acrylate co-polymer (94 per cent by weight of vinylidene chloride-6 per cent ethyl acrylate) is ground in a ball mill to an average particle size of less than 50 screen mesh with 3 parts by weight of 2.2'-dihydroxy-benzophenone, 5 parts by weight of tributyl-aconitate, and 5 parts by weight of α.α'-diphenyl-diethyl ether as stabilizers and plasticizers for the resin, and 10 parts by weight of phenothioxin as a preservative. The resultant mixture may be dusted onto deep pile carpeting in the amount of from 4 to 50 per cent by weight of the carpeting. The treated carpeting is then heated to 175° C. and thereafter cooled to solidify the resin particles in and about the preservative, and bond both to the fabric. No pressure is employed in order that the texture of the carpet be not affected.

EXAMPLE 4

A sample of white wool mohair originally impregnated with a 5 per cent solution of tricresyl phosphate in methyl ethyl ketone and thereafter air-dried may be dusted with from 5 to 100 per cent by weight of a mixture consisting of 75 per cent by weight vinyl chloride polymer and 25 per cent by weight vinylidene chloride polymer (softening point 160° C.), and thereafter warmed to a temperature of 200° to 220° C. and subjected to moderate pressure to obtain a semi-permeable protective coating of the polymer mixture adapted to bond the phosphate to the fabric and materially extend the period over which the fabric is protected against moths and carpet beetle larvae. The polymer mixture is employed as a finely-divided dust having an average particle size of less than 50 screen mesh.

Among other preservatives which may be employed in conjunction with finely-divided solid thermoplastic vinylidene chloride resins substantially as described in the foregoing examples are ortho-phenyl phenol, 2.4.5-trichlorophenol, 2.4.6-trichlorophenol 2.4.5.6-tetrachlorophenol, calcium salt of 2.4.5.6-tetrachlorophenol, lead salt of 2.4.5.6-tetrachlorophenol, barium salt of 2.4.5.6-tetrachlorophenol, lead salt of pentachlorophenol, calcium salt of pentachlorophenol, thymol, carvacrol, hydroxy-benzoic acids, salts, esters, and ethers of hydroxy-benzoic acids, aryl mercury salts, 3.3'.5.5'.4''-pentachloro-2.2'-dimethoxy-triphenyl-methane-2''-sulphonic acid sodium salt, beta-butoxy-beta'-thiocyano-diethyl ether, chloro xylenols, trinitro-isobutyl-xylene, para-nitrochlorobenzene, fluorine derivatives of naphthalene, diphenyl, and phenol, diphenyl-alkanes, aluminum fluoformate, diphenylene oxide, thianthrene, alkyl and alkylene diphenyl- and triphenyl-phosphonium-bromide, hexyl resorcinol, parachloro-benzene sulphonic acid ester of parachlorophenol, cyclohexyl phenols and their ethers, esters, and salts, and the like.

We claim:

1. A method for protecting textile materials against attack by plant and animal parasites comprising the steps of dusting an organic preservative and a finely-divided solid thermoplastic vinylidene chloride resin product into and on the textile material, subjecting the treated textile material to a temperature between the softening point of the resin product and the decomposition temperature of the resin product and preservative, and applying pressure to bond the resin product and preservative to the treated material.

2. A method for protecting textile materials against attack by plant and animal parasites comprising the steps of dusting from 0.25 per cent to 4.0 per cent by weight of a solid phenolic preservative and from 5 per cent to 50 per cent by weight of a finely-divided solid thermoplastic vinylidene chloride resin product into and on the textile material, subjecting the treated textile material to a temperature between the softening point of the resin product and the decomposition temperature of the resin product and preservative, and applying pressure to bond the resin product and preservative to the treated material.

3. A method for protecting textile materials against attack by plant and animal parasites comprising the steps of dusting a finely divided solid dispersion of an organic preservative dispersed in a finely-divided solid thermoplastic vinylidene chloride resin product into and on the textile material, subjecting the treated textile material to a temperature between the softening point of the resin product and the decomposition temperature of the resin product and preservative, and applying pressure to bond the resin product and dispersed preservative to the treated material.

4. A method for protecting textile materials against attack by plant and animal parasites comprising the steps of dusting a finely divided solid dispersion of a polychlorophenol dispersed in a finely divided solid thermoplastic vinylidene chloride resin product into and on the textile material, subjecting the treated textile material to a temperature between the softening point of the resin product and the decomposition temperature of the resin product and polychlorophenol, and applying pressure to bond the resin product and dispersed polychlorophenol to the treated material.

5. A method for protecting textile materials against attack by plant and animal parasites comprising the steps of dusting a finely divided solid dispersion of pentachlorophenol dispersed in a finely divided solid thermoplastic vinylidene chloride resin product into and on the textile material, subjecting the treated textile material to a temperature between the softening point of the resin product and the decomposition temperature of the resin product and pentachlorophenol, and applying pressure to bond the resin product and dispersed pentachlorophenol to the treated material.

ALDEN W. HANSON.
WILLIAM C. GOGGIN.